United States Patent
Passe et al.

(10) Patent No.: US 8,855,280 B1
(45) Date of Patent: Oct. 7, 2014

(54) COMMUNICATION DETAIL RECORDS (CDRS) CONTAINING MEDIA FOR COMMUNICATIONS IN CONTROLLED-ENVIRONMENT FACILITIES

(71) Applicant: Securus Technologies, Inc., Dallas, TX (US)

(72) Inventors: Scott Passe, Forney, TX (US); Adam C. Edwards, Fort Worth, TX (US)

(73) Assignee: Securus Technologies, Inc., Dallas, TX (US)

( * ) Notice: Subject to any disclaimer, the term of this patent is extended or adjusted under 35 U.S.C. 154(b) by 0 days.

(21) Appl. No.: 14/040,088

(22) Filed: Sep. 27, 2013

(51) Int. Cl.
*H04M 15/00* (2006.01)

(52) U.S. Cl.
CPC ..................... *H04M 15/41* (2013.01)
USPC ......................................................... 379/126

(58) Field of Classification Search
CPC ............... H04M 1/656; H04M 2203/6045; H04M 2003/6065; H04M 2203/258; H04M 3/42221; H04M 3/533; H04M 3/53333; H04M 15/47; H04M 15/88; H04M 2215/0148
USPC ................. 379/88.13, 88.26, 121.05, 126
See application file for complete search history.

(56) References Cited

U.S. PATENT DOCUMENTS

| | | | | |
|---|---|---|---|---|
| 6,665,380 | B1* | 12/2003 | Cree et al. | 379/88.25 |
| 7,805,457 | B1* | 9/2010 | Viola et al. | 707/769 |
| 2004/0137945 | A1* | 7/2004 | Takagi et al. | 455/558 |
| 2007/0087781 | A1* | 4/2007 | Bettis et al. | 455/556.1 |
| 2008/0118042 | A1* | 5/2008 | Hogg | 379/93.03 |
| 2011/0082874 | A1* | 4/2011 | Gainsboro et al. | 707/769 |
| 2012/0324050 | A1* | 12/2012 | Peters et al. | 709/217 |
| 2013/0066848 | A1* | 3/2013 | Tuttle et al. | 707/711 |
| 2013/0329595 | A1* | 12/2013 | Scholz | 370/252 |
| 2013/0329867 | A1* | 12/2013 | Hodge | 379/88.02 |

* cited by examiner

Primary Examiner — Binh Tieu
(74) Attorney, Agent, or Firm — Fogarty, L.L.C.

(57) ABSTRACT

Systems and methods for creating, maintaining, and making available Communication Detail Records (CDRs) containing media for communications in controlled-environment facilities are disclosed. In some embodiments, a method may include enabling, at least in part via one or more communication systems, a communication between two or more parties, where at least one of the two or more parties is a resident of a controlled-environment facility, and where the resident operates a communication device disposed within the controlled-environment facility. The method may also include creating, at least in part via the one or more communication systems, a CDR associated with the communication, where the CDR includes or references a digital media file.

20 Claims, 4 Drawing Sheets

COMMUNICATION DETAIL RECORDS (CDRS) CONTAINING MEDIA FOR COMMUNICATIONS IN CONTROLLED-ENVIRONMENT FACILITIES

TECHNICAL FIELD

This specification relates generally to communications, and, more particularly, to Communication Detail Records (CDRs) containing media for communications in controlled-environment facilities.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

The scope of what constitutes communication to the inmate population has traditionally consisted of voice-only telephone systems. In that context, a Communication Detail Record (CDR), also known as Communication Data Record, is a record produced by a telecommunications device that contains attributes that are specific to a phone call handled by that device.

Generally speaking, a CDR may contain metadata having data fields that describe a specific instance of a telecommunication transaction, but does not include the contents of that transaction—e.g., it does not include audio data or recordings. By way of an example, a CDR describing a particular phone call may include attribute such as: the phone number of the subscriber originating the call (calling party), the phone number receiving the call (called party), the starting time of the call (date and time), the call duration, the billing phone number that is charged for the call, the identification of the telephone exchange or equipment writing the record, a unique sequence number identifying the record, additional digits on the called number used to route or charge the call, the disposition or the results of the call (indicating, for example, whether or not the call was connected), the route by which the call entered the telephone exchange, the route by which the call left the exchange, etc.

SUMMARY

Systems and methods for creating, maintaining, and making available Communication Detail Records (CDRs) containing media for communications in controlled-environment facilities are disclosed. In an illustrative, non-limiting embodiment, a method may include enabling, at least in part via one or more communication systems, a communication between two or more parties, where at least one of the two or more parties is a resident of a controlled-environment facility, and where the resident operates a communication device disposed within the controlled-environment facility; and creating, at least in part via the one or more communication systems, a Communication Detail Record (CDR) associated with the communication, where the CDR includes or references a digital media file.

For example, the controlled-environment facility may be a jail or prison, the resident may be an inmate, and the communication may be a telephone call, a video visitation session, an electronic chat session, a video telephone call, a text message, a prerecorded video message, a social network message, or an electronic mail message. Moreover, the CDR may include one or more of: a phone number of a calling party, a phone number of a called party, a starting time of the communication, a duration of the communication, or a billing account charged for the communication.

In some implementations, the digital media file may include a still photograph of the resident captured via the communication device. Additionally or alternatively, the digital media file may include a movie of the resident captured via the communication device. Additionally or alternatively, the digital media file may include audio of the resident captured via the communication device.

The method may also include identifying, at least in part via the one or more communication systems, at least one of the two or more parties based upon a comparison between the digital media file and a signature; and adding the identification of the at least one of the two or more parties to the CDR. In some cases, at least one of the two or more parties is the resident, and the method may further include, in response to the identification of the resident not matching a Personal Identification Number (PIN) or other biometric or non-biometric information provided by the resident when accessing the communication device, initiating remedial action. For instance, the remedial action may be selected from the group consisting of: recording the communication, terminating the communication, and notifying a designated party of a security violation.

In some embodiments, contents of the digital media file may be obtained at least in part prior to the beginning of the communication. Additionally or alternatively, contents of the digital media file may be obtained at least in part during the communication. Additionally or alternatively, contents of the digital media file may be obtained at least in part after termination of the communication.

In another implementation, the communication may be a telephone communication, the communication may be is a telephone, the digital media file may include one or more still or moving images, and the method may include obtaining the media using an image capture device disposed within the controlled-environment facility but distinct from the telephone. Additionally or alternatively, the media may include one or more still or moving images obtained using an image capture device integrated into the communication device.

In another illustrative, non-limiting embodiment, a method may include enabling a communication between an inmate operating a communication device disposed within a correctional facility and a non-resident of the correctional facility, receiving a media file obtained in connection with the communication, and adding a media file to a CDR associated with the communication. The media file may be obtained using a media capture device disposed within the correctional facility, and the media file may include an image, video, or audio captured in the vicinity of the communication device. Additionally or alternatively, the media file may be obtained using a media capture device disposed outside of the correctional facility, and the media file may include an image, video, or audio captured in the vicinity of the non-resident.

In yet another illustrative, non-limiting embodiment, a method may include receiving a digital multimedia file included or referenced in a CDR associated with a communication between an inmate operating a communication device within a correctional facility and a non-resident outside of the correctional facility, and reproducing the digital multimedia file. At least a portion of the digital multimedia file may have been captured prior to the communication having been initiated or after the communication having been terminated.

In some embodiments, one or more of the techniques described herein may be performed via one or more computer systems or communication devices. In other embodiments, a tangible computer-readable storage medium may have program instructions stored thereon that, upon execution by one or more computer systems or communication devices, cause the one or more computer systems or communication devices to execute one or more operations disclosed herein. In yet other embodiments, a computer system or communication device may include at least one processor and a memory coupled to at least one processor. The memory may store program instructions executable by the at least one processor to execute one or more operations disclosed herein.

Figure 1:
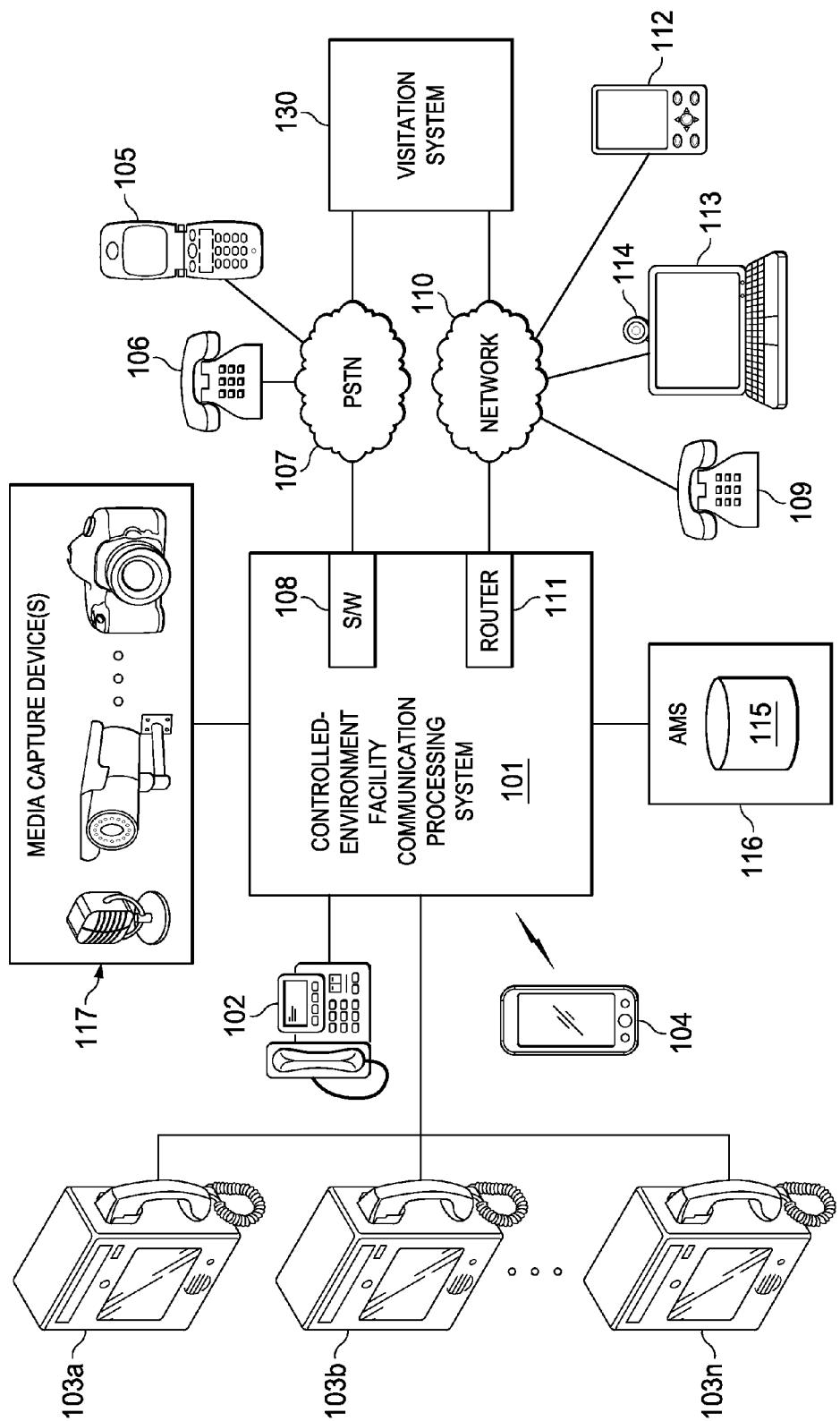
FIG. 1 is block diagram of an example of a system configured to provide communication services to controlled-environment facilities according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for creating, maintaining, and making available Communication Detail Records (CDRs) with media for communications in controlled-environment facilities. Various types of controlled environment facilities are present in today's society, and persons may be voluntary or involuntary residents of such facilities, whether temporarily or permanently. Examples of controlled environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the implementations discussed below, a controlled environment facility may be referred to as a jail or prison, and its residents may be referred to as arrestees, detainees, or inmates.

The inventors hereof have recognized that correctional facilities present numerous difficulties in areas such as security, surveillance, financial transactions, communications, visitation, investigation, etc.; which in turn make technological implementations uniquely challenging in those environments. In many cases, technologies that are used outside of correctional facilities are not immediately applicable to the correctional environment without significant changes and modifications. Moreover, correctional facilities may have specific needs that are not particularly relevant outside of those environments.

As such, some of the systems and methods described herein may be specifically tailored to address one or more of the aforementioned needs and challenges. It should be understood, however, that other systems and methods described herein may also be applicable to other types of controlled environment facilities and their respective residents (e.g., a hospital and its patients) and, in some cases, may be applicable to environments that are not controlled at all.

FIG. 1 is block diagram of an example of a system configured to provide communication services to controlled-environment facilities according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device 104 or the like to access such services. For example, an inmate may initiate telephone services by lifting the receiver on telephone 102, at which time the inmate may be prompted to provide a Personal Identification Number (PIN), other identifying information, including biometric and/or non-biometric information. An Interactive Voice Response (IVR) unit (not shown) may generate and play prompt or other messages to inmates on devices 102, 103, and/or 104.

Under the control of communication processing system 101, devices 102-104 may be capable of connecting to a non-resident's (i.e., a person not committed to or incarcerated within the controlled-environment facility) device 105 or telephone 106 across a Publicly Switched Telephone Network (PSTN) 107. For example, device 105 may be a mobile phone, whereas telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is connected to a Voice-over-IP (VoIP) or other packet data network 110, such as, for example the Internet. Router 111 of communication system 101 is used to route data packets associated with a call connection to destination telephone 109 or device 112.

Smart terminals 103a-n (each collectively referred to as "smart terminal 103") may have video conferencing capabilities to enable inmates to participate in video visitation sessions with non-residents of the correctional facility via video call, secure online chat, etc. In some embodiments, smart terminals 103 may include touch-screen devices. Additionally or alternatively, smart terminals 103 may include an image capture device, such as a webcam. For example, a non-resident party may have a personal or laptop computer 113 with camera 114 (or a cell phone, tablet computer, etc.). Additionally or alternatively, device 112 may have an integrated camera and touch-screen display (e.g., a smart phone, tablet, etc.).

A network connection between the parties may be established and supported by an organization or commercial service that provides computer services and software for use in telecommunications and/or VOIP, such as SKYPE. Additionally or alternatively, the correctional facility and/or the destination may use videoconferencing equipment compatible with ITU H.323, H.320, H.264, and/or V.80, or other suitable standards. Generally speaking, each smart terminal 103 may be disposed in a visitation room, in a pod, kiosk, etc.

In some cases, smart terminals 103 may also include Radio Frequency Identification (RFID) tag readers, barcode scanners, etc. to help identify the inmates operating those terminals, for example, when the inmates are each wearing a unique RFID tag, barcode bracelet, etc.

In addition to providing certain visitation and communication operations, communication processing system 101 may attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by Administration and Management System (AMS) 116. In addition to PAC list(s), AMS 116 may also store or access inmate or Resident Profile Data (RPD), as well as inmate financial data, such as commissary accounts or the like.

As an example, in the context of a correctional facility, database 115 may include RDP information such as, for example: balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and/or any other information that may be relevant or useful to correctional facility staff to house and maintain inmates.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more gateways, switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within communication system 101.

In some implementations, communication system 101 may be configured to perform video visitation monitoring operations configured to monitor and or record video visitations (e.g., as electronic video files). In scenarios where communication system 101 is located within the controlled-environment facility, it may have direct access to AMS 116. In other embodiments, however, communication system 101 may be located remotely with respect to the controlled-environment facility, and access to AMS 116 may be obtained via a computer network such as, for example, network 110.

In some embodiments, smart terminals 103 may be implemented as a computer-based system. For example, each of smart terminals 103 may include a display, camera, and handset. The display may be any suitable electronic display such as, for example, a Liquid Crystal Display (LCD), a touch-screen display (e.g., resistive, capacitive, etc.), or the like, whereas the camera may be a suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, smart terminals 103 may be configured to capture a video image of an inmate to be transmitted to a non-resident using the camera, and to display a video image of the non-resident to the inmate using the display. Smart terminals 103 may also be configured to capture an audio signal from the inmate to be transmitted to a non-resident using the mouthpiece portion of the handset, and to provide an audio signal from the non-resident to the inmate using the earpiece portion of the handset. Additionally or alternatively, audio received from the non-resident may be reproduced via a loudspeaker, and audio provided by the inmate may be captured via a microphone.

In addition to video visitation, smart terminals 103 may also be used by the inmate to access an inmate portal which allows access to communication processing system 101. The access available to the inmate through the inmate portal may be limited or restricted according to the inmate's permissions on the system 101.

In some implementations, an inmate may be able to use smart terminals 103 to access his/her personal account information, make purchases, and conduct certain electronic communications such as email, electronic chat, text messages, prerecorded video messages, social network messages, or the like. For example, smart terminals 103 may assume the form of any computer, tablet computer, smart phone, etc., or any other consumer device or appliance with videoconferencing capabilities.

In some embodiments, when a communication (e.g., a telephone call, a video call, a visitation session, an electronic chat session, a text message, a prerecorded video message, a social network message, an electronic mail message, etc.) between an inmate and a non-resident takes place via communication system 101, a record of that communication is created in the form of a Communication Detail Record (CDR), also known as a Communication Data Record. In some cases, a CDR may include a type record made from a video, also referred to as a Video Detail Record (VDR). Additionally or alternatively, a CDR may include a type of record made in association with a transaction (e.g., a financial transaction, a commissary purchase, etc.) and may be known as a Transaction Detail Record (TDR). As used herein, a CDR is a record produced by a telecommunications device that contains attributes that are specific to a communication of any type (including video, typed communications, transactions, etc.) handled by that device.

As such, communication system 101 may maintain a record of data for each communication between devices 102-104 and other devices 105, 106, 109, 112, or 113 in a database. Specifically, communication system 101 may maintain CDRs for calls or messages made to or from devices 102-104. In some cases, a separate CDR may be created for each call or other communication. For example, a CDR may identify the prisoner by name, account number or other identifier. Also, a CDR may include information to identify the source and destination of the call, such as a called and calling telephone number or Internet Protocol (IP) address. For calls originated by prisoners, the particular device used by the prisoner may be identified as well as the particular destination device. Additionally or alternatively, a CDR may include call routing data that identifies PSTN, data, and wireless networks used during a call. The name or identity of the called or calling party, if it is not the prisoner, may also be recorded.

Moreover, billing data, such as information used to pay for the call may be recorded. For example, the call may be paid for using collect call billing, a calling card account, prepaid account, a commissary account, or charges to the called or calling party's Local Exchange Carrier (LEC).

According to embodiments described herein, a CDR may further include a digital media file and/or a reference to digital media file stored in a database. Examples of digital media files include, but are not limited to, still photograph(s), movie(s), video, and/or audio. These media files may be obtained or captured, for example, directly via smart devices 103 and 104 operated by an inmate. Additionally or alternatively, digital media files may be obtained or captured by dedicated media capture devices 117 (e.g., cameras, camcorders, microphones, audio recorders, etc.). Additionally or alternatively, digital media files may be captured by the communication device 113/114 of a non-resident with whom a resident of the controlled-environment facility is communicating.

In some cases, a media capture device 117 may be part of an existing security surveillance infrastructure within a controlled-environment facility. In other cases, a media capture device 117 may be installed in physical proximity to communication device(s) 102-104 (e.g., in a visitation room or in the same pod, wing etc.) but be nonetheless distinct from those communication devices, and it may be used for the purpose of capturing media files to be added to CDRs.

For example, in a prison that has a telephone available to inmates, a video camera may be installed on a wall near the telephone and have its field of view aimed at the telephone. In that manner, images, video, and/or audio may be captured of the vicinity of the telephone. The captured media may include indicia of the resident who is authorized to operate the telephone and/or of the other parties (e.g., other residents) in physical proximity to the resident who may not be authorized to participate in the resident's communication.

It should be noted that, when media files are obtained or captured via smart devices 103 and 104, the portion of smart device 103 and 104 involved in the capture of the file may sometimes not be involved in the communication. For example, during a telephone call, a resident may use a microphone in smart device 103's and 104's handset to communicate with a non-resident. However, another microphone on the chassis of smart device 103 and 104 may be used to capture audio in the vicinity of the resident, including background sounds that the handset's microphone may not otherwise be able to capture. Moreover, still in the case of a voice-only telephone call, the camera of smart device 103 and 104 may not be used for the actual communication, but may nonetheless be activated to capture stills or moving pictures of the resident and/or his or her vicinity. Similarly, when the resident utilizes smart devices 103 to send or receive text messages, pre-recorded video, etc., device 103 may monitor the resident with components that are not being used in the communication.

In some implementations, the capture of media by smart devices 103 and/or media capture devices 117 may be time or clock-synchronized with the actual communications, such that the relationship between when an image or sound is captured and when a communication begins and/or ends is known. Particularly, in some cases, the contents of the media file added to a communication's CDR may be obtained at least in part prior to the beginning of that communication, at least in part during that communication, and/or at least in part after termination of that communication.

In some embodiments, upon capturing a media file, communication system 101 may identify a party to the communication based upon a comparison between the contents of the media file and a biometric or non-biometric signature. For example, communication system 101 may perform a voice recognition or face recognition operation, and may compare the results of the operation with a database of biometric or non-biometric signatures. Parties are authorized to participate in a communication, if the comparison results in a match. However, if the resident and/or non-resident's biometric or non-biometric signature does not match the captured media, remedial action may be triggered. Examples of remedial action triggered by communication system 101 include, but are not limited to, recording the communication, terminating the communication, and/or notifying a designated party of a security violation.

Figure 4:
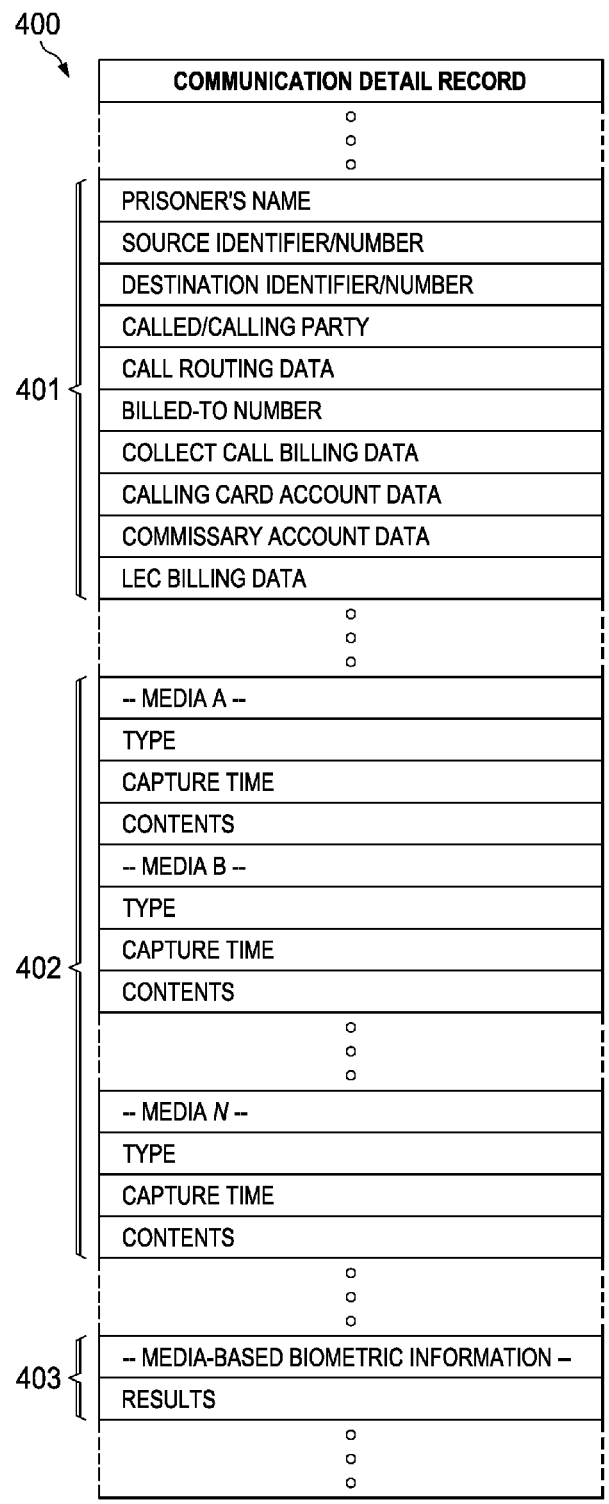
FIG. 4 is a diagram of an example of a CDR with media according to some embodiments.

Once captured by smart devices 103 and/or media capture devices 117, one or more media files may be added to a CDR. In some implementations, the media file may itself may be included in the CDR. Additionally or alternatively, a reference or path to the data file stored elsewhere may be added to the CDR. Also, communication system 101 may add the biometric-based identification of part(ies) to the CDR. The exact format of the CDR, as well as all of its attributes, may vary and/or may be configurable by an administrator or user. An example of such a CDR is shown in FIG. 4.

In some cases the communication may be recorded and a copy of the recording stored in the CDR real-time for later review and analysis. In other cases, the communication may be transcribed and the transcription may also be stored in the CDR. If the communication is a text or email message, a copy of the message may be stored as well.

Figure 2:
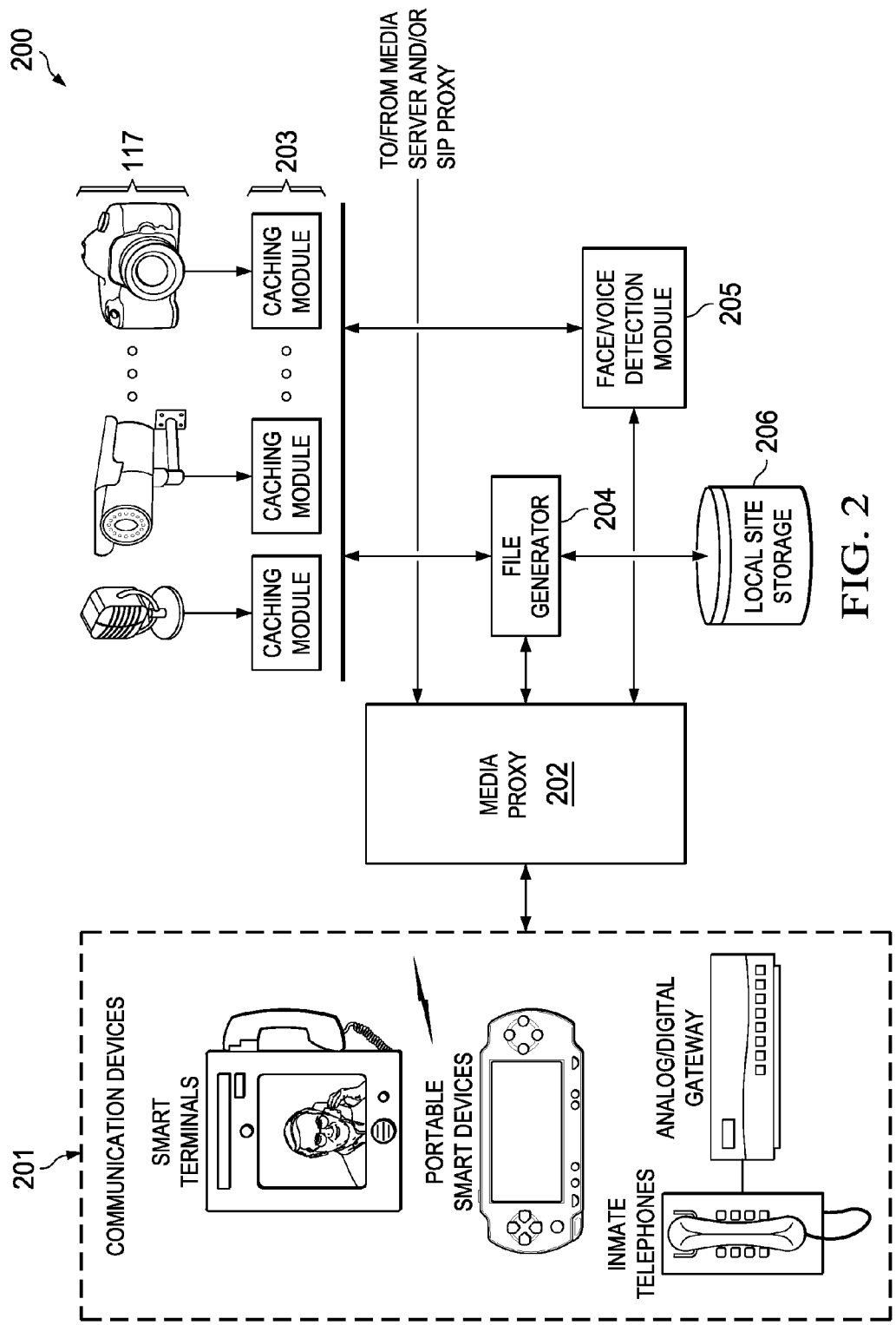
FIG. 2 is block diagram of an example of a Communication Detail Record (CDR) system configured to create, maintain, and/or make available CDRs with media for communications in controlled-environment facilities according to some embodiments.

FIG. 2 is block diagram of an example of CDR system 200 configured to create, maintain, and/or make available CDRs with media for communications in controlled-environment facilities. In some embodiments, CDR system 200 may be part of (or coupled to) communication system 101 of FIG. 1, and/or it may be deployed as a hybrid solution partially on the facility and partially remotely located with respect to that facility.

Particularly, CDR system 200 includes communication devices 201. Gateway 201 is coupled to media proxy 202. In some embodiments, media proxy 202 may be configured to operate as a Session Initiation Protocol (SIP) Business-to-Business (B2B) agent between communication devices 201 and a media server or SIP proxy, for example, within visitation system 130. Media proxy 202 may have awareness of call setup and release, and/or it may handle voice and/or video call media paths. It may also use a copy of an original voice/video call media path to combine with video input for a video recording file.

Media proxy 202 is coupled to file generator 204 and to face/voice detection module 205. File generator 204 is coupled to caching modules 203, which in turn are coupled to media capture devices 117. Detection module 205 and face/voice detection module 205 are coupled to local site storage 206.

Upon a call setup event, media proxy 202 may command a corresponding one of media caching modules 203 to stream through the live video, image and/or audio content from a respective one of media capture devices 117 for the communication. In some cases, media proxy 202 may command media caching modules 203 to provide a "lead-time" of video, image, and/or audio recording, if so configured (e.g., 10, 20, 30, or 60 seconds prior to the call setup event, etc.). Media proxy 202 may also command media caching modules 203 to provide a "tail end" of video, image, and/or audio recording, if so configured (e.g., 10, 20, 30, or 60 seconds after a call release event, etc.).

In some cases, file generator 204 may create a media file to be associated with a communication and stored in a corresponding CDR, as well as within local site storage 206. Additionally or alternatively, a reference or path to the media file stored within local site storage 206 may be added to the CDR. The CDR may be created, for example, by media proxy 202. Additionally or alternatively, the media file may be appended to an existing CDR by media proxy 202, and/or by a media server or SIP proxy (not shown).

In some implementations, upon call setup event, media proxy 202 may command face/voice detection module 205 to detect a facial image and/or voice of the caller, if so configured, and to determine whether the image or voice matches a predetermined biometric or non-biometric signature of the caller. Media proxy 202 may report the detection results and/or may add those results to the CDR. Then, upon call release event or after a configurable time, media proxy 202 stops receiving video/audio data from media caching modules 203.

File generator 204 may receive audio/video content from communication devices 201, and it may perform one or more transcoding operations. It may also receive audio/video content from caching modules 203. As such, file generator 204 may time-sync two or more sources of content, and may generate a file in a suitable format (e.g., MP4, etc.).

Face/voice detection module 205 is controlled by media proxy 202 to start and stop face/voice detection operations, and reports the results of those operations to media proxy 202. In some cases, upon successful identification of a party to the communication, a still image of the frontal face may be captured in a suitable format (e.g., PNG).

In various embodiments, the modules shown in FIG. 2 represent sets of software routines, logic functions, hardware, and/or data structures that are configured to perform specified operations. Although these modules are shown as distinct blocks, in other embodiments at least some of the functionality provided by these modules may be combined into fewer blocks. Conversely, any given one of modules 201-206 may be implemented such that its functionality is divided among two or more blocks. Moreover, although shown with a particular configuration, in other embodiments these various modules may be rearranged in other ways.

Figure 3:
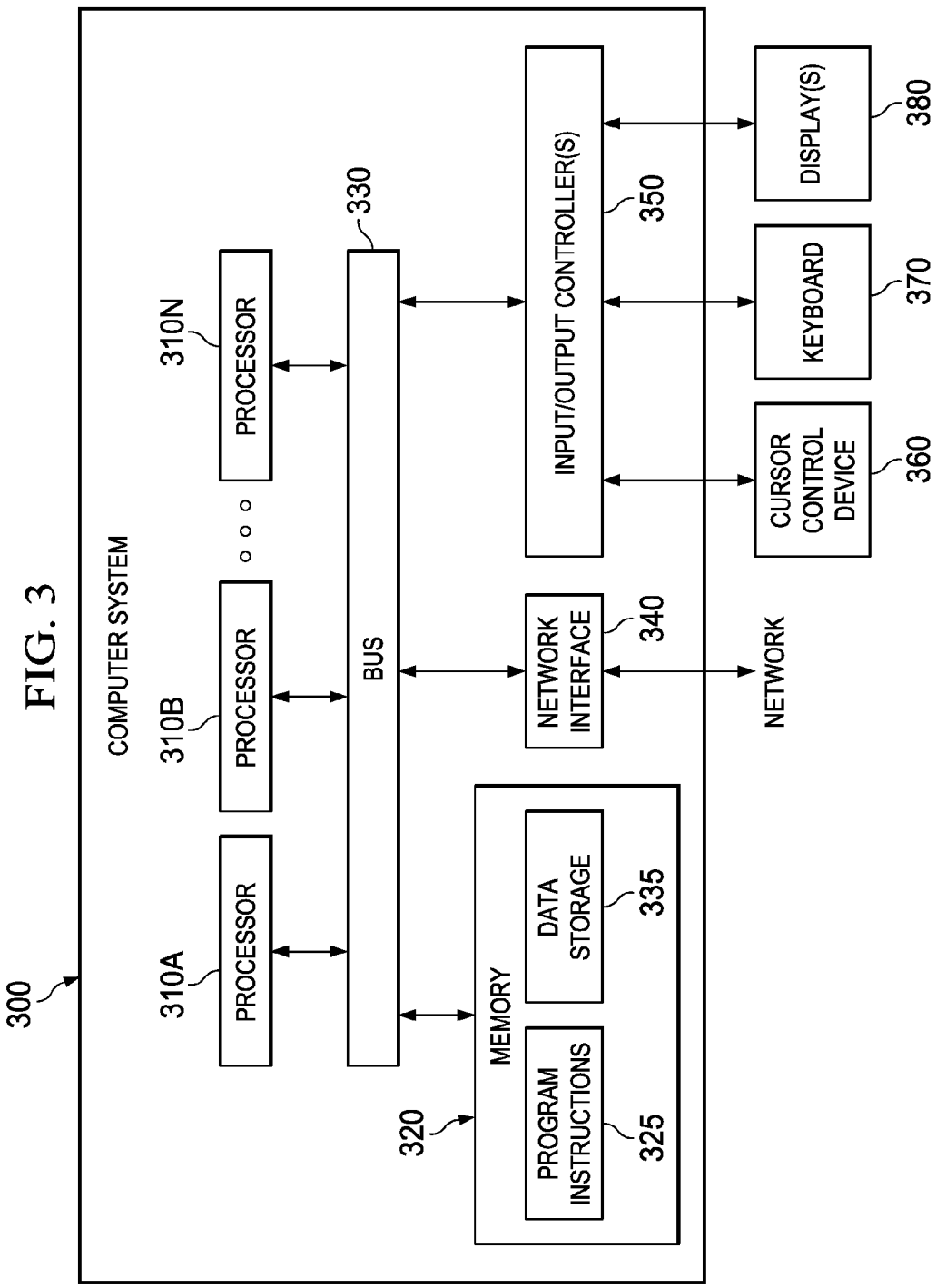
FIG. 3 is a block diagram of an example of a computing device configured to implement systems and methods disclosed herein according to some embodiments.

Embodiments of systems and methods for creating, maintaining, and making available CDRs with media for communications in controlled-environment facilities, as described herein, may be implemented or executed by one or more computer systems. One such computer system is illustrated in FIG. 3. In various embodiments, computer system 300 may be a server, a mainframe computer system, a workstation, a network computer, a desktop computer, a laptop, or the like. For example, in some cases, one or more of blocks 201-206 shown in FIG. 2 may be implemented as computer system 300. Moreover, one or more of communication devices 103, 104, and 113; communication system 101; and visitations system 130 may include one or more computers in the form of computer system 300. As explained above, in different embodiments these various computer systems may be configured to communicate with each other in any suitable way, such as, for example, via network 110.

As illustrated, computer system 300 includes one or more processors 310A-N coupled to a system memory 320 via bus 330. Computer system 300 further includes a network interface 340 coupled to bus 330, and one or more I/O controllers 350, which in turn a coupled to peripheral devices such as cursor control device 360, keyboard 370, display(s) 380, etc. Each of I/O devices 360-380 may be capable of communicating with I/O controllers 350, for example, via a wired connection (e.g., serial port, Universal Serial Bus port) or wireless connection (e.g., Wi-Fi, Bluetooth, Near Field Communications Link, etc.) Other devices may include, for example, surveillance cameras, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as those described herein may be stored within system memory 320 as program instructions 325 and data storage 335, respectively. In other embodiments, program instructions and/or data may be received, sent or stored upon different types of computer-accessible media or on similar media separate from system memory 320 or computer system 300.

Generally speaking, a computer-accessible medium may include any tangible or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the device, including network interface 340 or other peripheral interfaces, such as input/output devices 350. In some embodiments, bus 330 may perform any necessary protocol, timing or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all of the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data may be accessible by program instructions 325. In an embodiment, program instructions 325 may include software elements of embodiments illustrated herein. For example, program instructions 325 may be implemented in various embodiments using any desired programming language, scripting language, or combination of programming languages and/or scripting languages (e.g., C, C++, C#, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

FIG. 4 is a diagram of an example of CDR with media 400. In some embodiments, CDR 400 may be created, at least in part, by communications system 101 and/or CDR system 200. Particularly, portion 401 of CDR 400 includes a prisoner's name, a source identifier/number, a destination identifier/number, a called/calling party, call routing data, billed-to-number, collect call billing data, calling card account data, commissary account data, LEC billing data, etc. It should be noted that, generally speaking, portion 401 may be implementation specific, and may include more or fewer of the aforementioned fields.

Portion 402 of CDR 400 includes one or more media files ("Media A," "Media B," "Media N"). For each media file, the type of media (e.g., audio, video, still image, etc.) as well as a time of capture of the media and the contents of the media file may be stored. In alternative embodiments, rather than including the contents of the media file in CDR 400, a pointer, reference, or path to the contents of the media file (stored separately) may be provided.

Portion 403 of CDR 400 includes media-based biometric and non-biometric information, for example, that have been obtained from the processing of media files by face/voice detection module 205. After the processing of those media files by module 205, results may be stored in the CDR. Examples of results may include, but are not limited to, the identity of one or more persons participating in a communication, the number of persons participating in the communication, whether the identified person(s) are authorized to participate in the communication, etc.

Here it should be noted that the format of portions 402 and 403 are also implementation specific and may vary from application to application. For example, in some cases, portion 403 may be included in portion 402 of CDR 400. For instance, the results of biometric analysis of each media file may be stored along with that media file.

Figure 5:
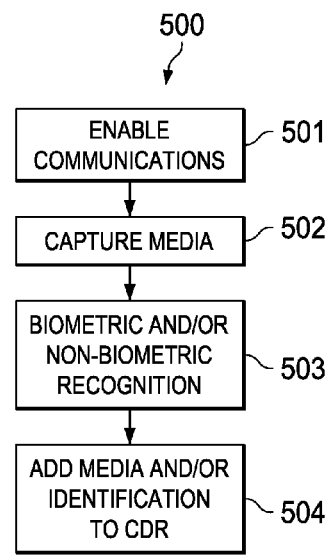
FIG. 5 is a flowchart of an example of a method for creating a CDR with media according to some embodiments.

FIG. 5 is a flowchart of an example of method 500 for creating a CDR with media. In some embodiments, method 500 may be performed, at least in part, by communications system 101 and/or CDR system 200. At block 501, method 500 includes enabling a communication between two or more parties. At least one of the two or more parties may be a resident of a controlled-environment facility, and the resident may operate a communication device disposed within the controlled-environment facility. For example, the facility may be a jail or prison and the resident may be an inmate. Also, the communication may include a telephone call, a video visitation session, an electronic chat session, a video telephone call, a text message, a prerecorded video message, a social network message, and/or an electronic mail message.

At block 502, method 500 includes capturing media associated with the communication, for example in the form of a digital media or multimedia file. In some cases, the digital media file may include a still photograph, a movie, video, and/or audio of the resident or of a non-resident party. For example, the media file may be obtained using the communication device or a distinct media capture device disposed within the correctional facility, and it may include an image, movie, or audio captured in the vicinity of the communication device. Additionally or alternatively, the media file may be obtained using a media capture device disposed outside of the correctional facility, and it may include an image, movie, or audio captured in the vicinity of a non-resident party participating in the communication. Moreover, the digital media file may be obtained, at least in part, prior to the beginning of the communication, during the communication, and/or after termination of the communication.

At block 503, method 500 includes performing one or more biometric recognition operations based, at least in part, upon the captured media file(s). For instance, block 503 may include identifying at least one of the two or more parties based upon a comparison between the digital media file and an image (e.g., face) or audio-based biometric signature. Additionally or alternatively, method 500 may perform non-biometric identification, for example, based upon RFID tags, scanners, barcodes, etc. that may be associated (e.g., worn) by those parties.

Still as part of block 503, in response to the identification of the resident not matching a Personal Identification Number (PIN) or other biometric information provided by the resident when accessing the communication device, method 500 may include initiating remedial action. Examples of such remedial action include, but are not limited to, recording the communication, terminating the communication, or notifying a designated party of a security violation.

At block 504, method 500 includes adding the media file, a reference to the media file, and/or the identification of the at least one of the two or more parties to a CDR associated with the communication. The CDR may also include other information such as, for example: a phone number of a calling party, a phone number of a called party, a starting time of the communication, a duration of the communication, or a billing account charged for the communication.

At a later time, a user or administrator may operate a computing device or the like to retrieve the digital media file included or referenced in the CDR associated with a communication that has been created using the systems and methods described herein. The user or administrator may then reproduce the digital media file using any suitable multimedia reproduction software.

The various systems and methods illustrated in the figures and described herein represent example embodiments of systems and methods for creating, maintaining, and making available CDRs with media for communications in controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
enabling, at least in part via one or more communication systems, a communication between two or more parties, wherein at least one of the two or more parties is a resident of a controlled-environment facility, and wherein the resident operates a communication device disposed within the controlled-environment facility;
creating, at least in part via the one or more communication systems, a Communication Detail Record (CDR) associated with the communication, wherein the CDR includes or references a digital media file;
identifying, at least in part via the one or more communication systems, at least one of the two or more parties based upon a comparison between the digital media file and a signature; and
adding a resulting identification of the at least one of the two or more parties to the CDR.

2. The method of claim 1, wherein the controlled-environment facility is a jail or prison, and wherein the resident is an inmate.

3. The method of claim 1, wherein the communication is selected from the group consisting of: a telephone call, a video visitation session, an electronic chat session, a video telephone call, a text message, a prerecorded video message, a social network message, and an electronic mail message.

4. The method of claim 1, wherein the CDR includes one or more of: a phone number of a calling party, a phone number of a called party, a starting time of the communication, a duration of the communication, or a billing account charged for the communication.

5. The method of claim 1, wherein the digital media file includes a still photograph of the resident captured via the communication device.

6. The method of claim 1, wherein the digital media file includes a movie of the resident captured via the communication device.

7. The method of claim 1, wherein the digital media file includes audio of the resident captured via the communication device.

8. The method of claim 1, wherein the at least one of the two or more parties is the resident, the method further comprising:
in response to the identification of the resident not matching a Personal Identification Number (PIN) or other biometric or non-biometric information provided by the resident when accessing the communication device, initiating remedial action.

9. The method of claim 8, wherein the remedial action is selected from the group consisting of: recording the communication, terminating the communication, and notifying a designated party of a security violation.

10. The method of claim 1, wherein contents of the digital media file are obtained at least in part prior to the beginning of the communication.

11. The method of claim 1, wherein contents of the digital media file are obtained at least in part during the communication.

12. The method of claim 1, wherein contents of the digital media file are obtained at least in part after termination of the communication.

13. The method of claim 1, wherein the communication is a telephone communication, the communication device is a telephone, and the digital media file includes one or more still or moving images, the method further comprising obtaining the media using an image capture device disposed within the controlled-environment facility but distinct from the telephone.

14. The method of claim 1, wherein the media includes one or more still or moving images obtained using an image capture device integrated into the communication device.

15. A non-transitory computer-readable storage medium having program instructions stored thereon that, upon execution by one or more computer systems, cause the one or more computer systems to:
  enable a communication between an inmate operating a communication device disposed within a correctional facility and a non-resident of the correctional facility;
  receive a media file obtained in connection with the communication;
  add a media file to a Communication Detail Record (CDR) associated with the communication;
  identify the inmate and/or the non-resident based upon a comparison between the media file and a signature; and
  add a resulting identification of the resident and/or the non-resident to the CDR.

16. The non-transitory computer-readable storage medium of claim 15, wherein the media file is obtained using a media capture device disposed within the correctional facility, separate from the communication device, and wherein the media file includes an image, video, or audio captured in the vicinity of the communication device.

17. The non-transitory computer-readable storage medium of claim 15, wherein the media file is obtained using a media capture device disposed outside of the correctional facility, separate from a communication device used by the non-resident, and wherein the media file includes an image, video, or audio captured in the vicinity of the non-resident.

18. A system, comprising:
  at least one processor; and
  a memory coupled to the at least one processor, the memory configured to store program instructions executable by the at least one processor to cause the system to:
    receive a digital multimedia file included or referenced in a Communication Detail Record (CDR) associated with a communication between an inmate operating a communication device within a correctional facility and a non-resident outside of the correctional facility;
    identify the inmate and/or the non-resident based upon a comparison between the digital multimedia file and a signature; and
    add a resulting identification of the resident and/or the non-resident to the CDR; and
    reproduce the digital multimedia file.

19. The system of claim 18, wherein at least a portion of the digital multimedia file is captured prior to the communication having been initiated or after the communication having been terminated.

20. The method of claim 5, wherein identifying at least one of the parties based upon a comparison between the digital media file and a signature comprises performing one or more biometric operations upon the still photograph of the resident.

* * * * *